United States Patent
Liang et al.

(10) Patent No.: US 6,214,273 B1
(45) Date of Patent: Apr. 10, 2001

(54) MOLDING METHOD WITH THE USE OF MODIFIED RUNNERS

(75) Inventors: Chee Tay Liang, Singapore (SG); Jeremias P. Libres, Dallas, TX (US); Julius Lim, Singapore (SG); Jin Sin Sai, Singapore (SG); Chee Moon Ow, Singapore (SG); Mario A. Bolanos-Avila, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/189,318

(22) Filed: Nov. 10, 1998

(Under 37 CFR 1.47)

Related U.S. Application Data

(60) Provisional application No. 60/060,560, filed on Sep. 30, 1997, provisional application No. 60/060,495, filed on Sep. 30, 1997, provisional application No. 60/060,398, filed on Sep. 30, 1997, and provisional application No. 60/060,562, filed on Sep. 30, 1997.

(51) Int. Cl.[7] .............................. B29C 31/06; B29C 45/02
(52) U.S. Cl. ................................ 264/272.14; 264/272.17; 264/328.4; 425/116; 425/544
(58) Field of Search .......................... 264/272.11, 272.14, 264/272.13, 272.17, 328.4, 328.5, 328.12; 425/116, 120, 123, 129.1, 130, 543, 544

(56) References Cited

U.S. PATENT DOCUMENTS

| | | | |
|---|---|---|---|
| 5,052,907 | * 10/1991 | Matumoto et al. | 264/272.17 |
| 5,071,334 | * 12/1991 | Obara | 264/272.17 |
| 5,182,071 | * 1/1993 | Knapp et al. | 264/272.13 |
| 5,384,286 | * 1/1995 | Hirai | 437/207 |
| 5,435,953 | * 7/1995 | Osada et al. | 264/272.14 |
| 5,596,797 | * 1/1997 | Bumsted | 264/272.15 |
| 5,645,864 | * 7/1997 | Higuchi | 425/116 |
| 5,891,377 | * 4/1999 | Libres et al. | 264/276 |

* cited by examiner

*Primary Examiner*—Angela Ortiz
(74) *Attorney, Agent, or Firm*—Gary C. Honeycutt

(57) ABSTRACT

An improved mold system (20) is provided. The mold system (20) includes a mold (30) having a mold cavity (28). A pot (22) is connected to the mold cavity (28) through a boomerang runner system (24). The boomerang runner system may include a boomerang passage (25) having an inner curvilinear surface (44) and an outer curvilinear surface (42).

5 Claims, 2 Drawing Sheets

MOLDING METHOD WITH THE USE OF MODIFIED RUNNERS

RELATED APPLICATIONS

This application is related to the following provisional applications: *Method and System of Molding,* filed Sep. 30, 1997, having a Ser. No. of 60/060,560, *Molding System and Method,* filed Sep. 30, 1997, having a Ser. No. of 60/060, 495, and an *Bellows Container System and Method,* filed Sep. 30, 1997, having a Ser. No. of 60/060,398, and an and *Vacuum Mold Cavity System and Method,* filed Sep. 30, 1997, having a Ser. No. of 60/060,562.

TECHNICAL FIELD OF THE INVENTION

This invention relates generally to the molding of plastics and more particularly to a boomerang runner system in a molding system.

BACKGROUND OF THE INVENTION

Plastics, or polymers, are used in a variety of products and applications ranging from the simple pen to the complicated wing of an aircraft. Different types of plastic, or polymers, as they are technically known, generally have different mechanical, chemical, and electrical properties that allow plastics to be used in many applications. Plastics are typically formed into a product through a molding process, such as extrusion, injection molding, sheet molding, or blow molding. For example, plastics are used extensively in the computer and semiconductor industry in a wide variety of applications. One such application is the encapsulation of semiconductor devices, particularly integrated circuits. Encapsulating a semiconductor device in plastic materials protects the device from environmental damage and also provides structural strength to the semiconductor device.

Conventional molding systems and processes suffer from numerous disadvantages. A disadvantage of some conventional systems that use a thin film, such as those used in "3P technology" molding processes, is that the film for prepackaging pencils of a molding material often restricts the flow of the molding material into a mold cavity. The restriction may cause turbulence that entraps air and may also cause the associated mold cavity to be under-filled with the molding material. The under-filled condition or the air contained in the molding material may form internal voids in the final molded product. Internal voids are bubbles and clusters of bubbles or voids in the molded product that affect the intended use of the molded product.

Internal voids often degrade the mechanical, electrical, and chemical properties, as well as the appearance, of the molded product. In the case of encapsulated semiconductor devices, internal voids reduce the reliability of the package because they allow moisture to accumulate within the voids. This moisture may cause corrosion of the semiconductor device and may promote cracking when the encapsulated semiconductor device is subjected to additional processing, such as vapor phase reflow or a similar process.

SUMMARY OF THE INVENTION

Accordingly, a need has arisen for an improved molding system and method. The present invention provides a molding system and method that addresses shortcomings of prior molding systems and methods.

According to one aspect of the invention, a method for encapsulating a semiconductor device includes forming a mold with a mold cavity. The mold cavity may be connected to a pot by a boomerang runner system. The pot may contain a non-solidified molding material for use in the molding process. The boomerang runner system may include a boomerang passage that includes an inner curvilinear surface and an outer curvilinear surface. A semiconductor is placed within the mold cavity and the non-solidified molding material in the pot is transferred from the pot through the boomerang runner system into the mold cavity. The non-solidified molding material in the mold cavity encapsulates the semiconductor device. The non-solidified molding material then hardens or solidifies around the semiconductor device.

According to another aspect of the invention, a molding system may include a mold cavity contained within a mold. A pot may be connected to the mold cavity by a boomerang runner system. The boomerang runner system may include an inner curvilinear surface and an outer curvilinear surface.

The invention provides several technical advantages. For example, the invention improves the quality of the finished molded product by reducing or eliminating internal voids by, at least in part, reducing the amount of air entrained in the molding material. The invention also increases the cross sectional flow area of a molding material flowing from a pot to a mold cavity. The increased cross sectional floor area is especially important when 3P technology release films are used in the molding process. In addition, the invention allows the density of the molded product or package density, to be increased. The increase in package density allows the encapsulation of a next generation of semiconductor devices that have an ever increasing number of leads and requires a finer resolution of detail in the encapsulation material.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF INVENTION

An embodiment of the present invention and its advantages are best understood by referring to FIGS. 1 through 4 of the drawings, like numerals being used for like and corresponding parts of the various drawings.

The invention relates to a mold system having, according to one embodiment, a boomerang runner system that communicates a molding material from a pot to a mold cavity. A boomerang passage allows a molding material to flow more efficiently and with less turbulence into a mold cavity than some prior devices. A boomerang runner system also reduces the amount of air that a molding material entraps when the molding material is flowing through the boomerang runner system. The reduced air and increased efficiency reduces internal voids and increases the overall quality of the final molded product.

Figure 1:
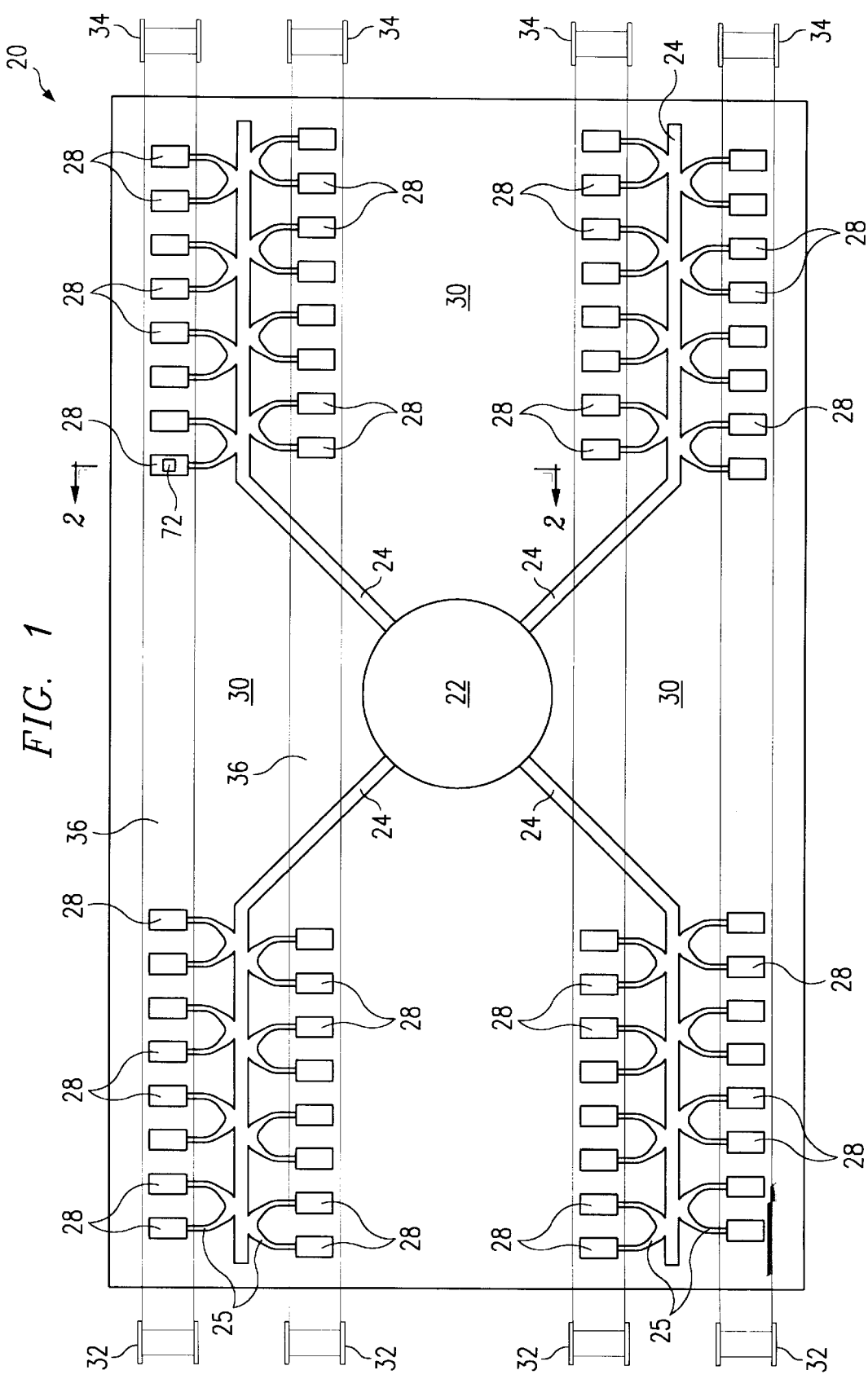
FIG. 1 is a schematic drawing illustrating a top view of a mold system according to one embodiment of the present invention.
Figure 2:
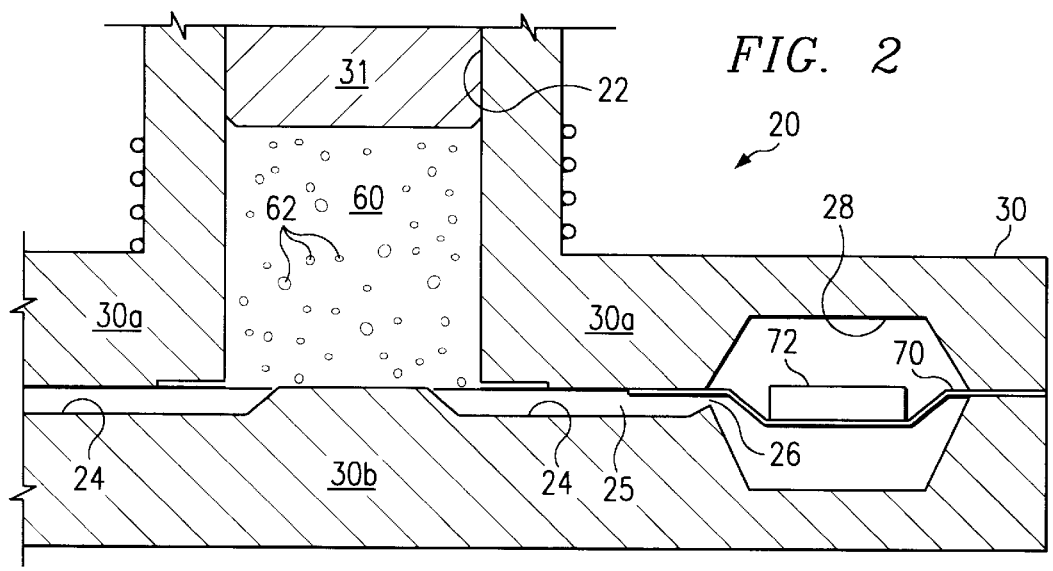
FIG. 2 is a cross section of the mold system of FIG. 1 taken along line 2—2 of FIG. 1.

FIG. 1 is a schematic drawing illustrating a top view of one embodiment of mold system 20, and FIG. 2 is a cross section of mold system 20 taken along line 2—2 of FIG. 1. As illustrated in FIGS. 1 and 2, mold system 20 may include a mold 30 having a first chase 30a and a second chase 30b, which cooperate to form a system of passages and cavities between the chases. Often formed between first chase 30a and second chase 30b a mold cavity 28, or series of mold cavities 28 as illustrated in FIG. 1, that is connected to a boomerang runner system 24. Pot 22 may be any device or system that forms a reservoir for a molding material 60. For example, pot 22 may be a single pot mold or a multipot mold. In addition, pot 22 may be a rectangular sleeve as often used in 3P technology molding processes. Pot 22 may be incorporated into mold 30 and connected to boomerang runner system 24. As best illustrated by FIG. 1, pot 22 is connected to mold cavity 28 by boomerang runner system 24.

As illustrated in FIG. 2, pot 22 contains molding material 60 for use in the molding process. A plunger 31 may be slidably movable within pot 22 to force molding material 60 contained within pot 22 through boomerang runner system 24 into mold cavities 28. Although pot 22 is shown as part of first chase 30a, pot 22 may also be formed as part of second chase 30b. Pot 22 may also be formed in any shape or size suitable for molding applications.

Molding processes that utilize 3P technology may incorporate a layer of release film 36 that is vacuum formed to each mold cavity 28. 3P technology molding processes may also utilize a wrapping film for prepackaging molding material 60. 3P technology is described in U.S. Pat. No. 5,431,854, entitled *Method for Pressing A Plastic Which Cures By Means Of A Reaction, Into a Mould Cavity, A Pressing Auxiliary In Pill Form To Be Used In This Method And A Holder Composed Of Such Material;* U.S. Pat. No. 5,098,626, entitled *Method For Packing A Measured Quantity Of Thermosetting Resin And Operating A Mold For Encapsulating A Component;* and European Patent Application No. 95200178.2, filed Jan. 25, 1995, entitled *Method For Encasing An Electronic Component With Hardening Plastic, Electronic Components With Plastic Encasement Obtained By This Method, And Mould For Carrying Out The Method,* which are incorporated herein by reference.

Release film 36 may be packaged on a dispenser roll 32 and a take-up roll 34 such that release film 36 may be stretched across each mold cavity 28. A vacuum system may vacuum form release film 36 to the surface of each mold cavity 28 of each chase, 30a and 30b. When first chase 30a and second chase 30b are assembled to form mold 30, each layer of release film 36 is compressed and forms a seal surrounding mold cavity 28.

The molding process may be used to encapsulate a semiconductor device 72 in molding material 60. Semiconductor device 72 may be connected to a lead frame 70 that is loaded between first chase 30a and second chase 30b such that mold cavity 28 surrounds semiconductor device 72.

As discussed in greater detail below, boomerang runner system 24 may include a boomerang passage 25. Boomerang runner system 24 allows molding material 60 to flow smoothly and efficiently from pot 22 to mold cavity 28.

Molding material 60 may be any type of plastic or polymer, such as thermosets or thermoplastics. During the molding process, molding material 60 is non-solidified. Prior to the molding process, molding material 60 may be in the form of powder, cold compacted power in the form of pellets or preforms, or a low viscosity molding material. Low viscosity molding materials 60 may include liquid, putty, or other very low viscosity molding materials 60 that have a low viscosity during the molding process. Low viscosity molding materials 60 do not typically include powder molding materials 60.

Figure 3:
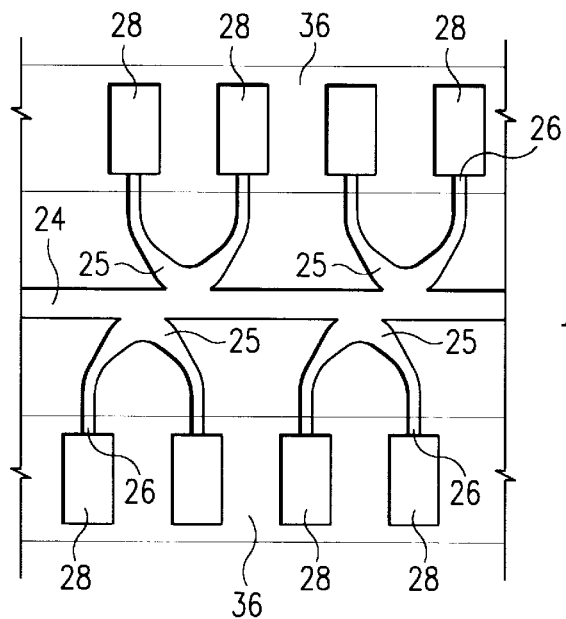
FIG. 3 is a schematic drawing illustrating a top view of a section of the mold system of FIG. 1 according to an embodiment of the present invention and shows, in part, a boomerang runner system.

FIG. 3 is a schematic drawing illustrating a top view of a portion of mold system 20 as shown in FIG. 1. Boomerang runner system 24 may include boomerang passage 25 that is connected to mold cavities 28. Boomerang runner system 24 may also include a gate 26, which forms a transition from boomerang passage 25 to mold cavity 28.

Figure 4:
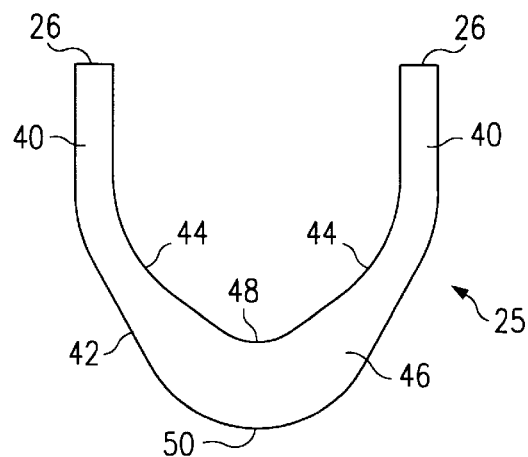
FIG. 4 is a schematic drawing illustrating a top view of a boomerang passage according to an embodiment of the present invention.

FIG. 4 is a schematic drawing illustrating a top view of an embodiment of boomerang passage 25 as shown in FIG. 3. Boomerang passage 25 may include a body 46 and one or more legs 40 that are defined, in part, by an inner curvilinear surface 44 and an outer curvilinear surface 42. Inner curvilinear surface 44 and outer curvilinear surface 42 may include any generally curved surface that provides a gradual transition for molding material 60 flowing into mold cavities 28. Inner curvilinear surface 44 and outer curvilinear surface 42 may also include various linear portions without departing from the spirit and scope of the present invention. According to one embodiment, body 46 may be defined, in part, by an apex 48 on inner curvilinear surface 44. This embodiment may include a pair of legs 40 connected to body 46.

In operation, and as best illustrated by FIG. 2, molding material 60 is placed within pot 22 between plunger 31 and boomerang runner system 24. Molding material 60 may be melted just prior to the molding process. During a transfer phase of the molding process, non-solidified molding material 60 is transferred from pot 22 into mold cavities 28. To transfer molding material 60, plunger 31 extends toward boomerang runner system 24, thereby applying a compressive load to non-solidified molding material 60 contained in pot 22. In response to the compressive load from plunger 31, non-solidified molding material 60 is forced to flow through boomerang runner system 24 into mold cavity 28.

Prior molding systems often use a runner system that includes numerous right angle turns in the flow path that cause turbulence in the molding material. The turbulence in the runner system may cause air to become entrapped in the molding material as the molding material flows from the pot through the runner system into the mold cavity. The air contained in the molding material may form internal voids in the molded product.

In accordance with the teachings of the present invention, boomerang runner system 24 allows a smooth flow of non-solidified molding material 60 into mold cavities 28, reducing turbulence in molding material 60 and the amount of entrained air 62 in molding material 60. The reduction in entrained air 62 in molding material 60 reduces the internal voids in the final molded product and increases the overall quality of the final molded product. In addition, when release film 36 is used in conjunction with boomerang runner system 24, the flow of molding material 60 through boomerang runner system 24 is not adversely affected by release film 36, thus allowing release film 36 to be used in a greater number of molding applications.

During a packing phase, non-solidified molding material 60 contained within mold cavity 28 is compressed to reduce entrained air and bubbles 62. To pack molding material 60, plunger 31 extends farther toward runner system 24, increasing the compressive load on non-solidified molding material 60 contained within pot 22. The increased pressure is communicated through boomerang runner system 24 to mold cavity 28, increasing the compressive pressure on non-solidified molding material 60 within mold cavity 28 surrounding semiconductor device 72. Although packing is not always a necessity, its purpose is to further reduce the entrained air or bubbles 62 that cause internal voids by compressing air bubbles 62.

Although the present invention and its advantages have been described in detail, it should be understood that various changes, substitutions, and alterations can be made therein without departing from the spirit and scope of the present invention as defined by the appended claims.

What is claimed is:

1. A method of molding comprising the steps of:

providing a mold having multiple mold cavities;

connecting a runner system having multiple branches, each branch leading to a mold cavity, each of said branches having a segment of increased cross-sectional flow area defined, in part, by an inner curvilinear surface and an outer curvilinear surface;

transferring a non-solidified molding material through the runner system into each mold cavity; and solidifying the non-solidified material.

2. The method of claim 1, wherein the step of connecting a runner system comprises the step of forming a gate at a transition from the at least one leg to the mold cavity.

3. The method of claim 1, wherein the step of transferring a non-solidified molding material comprises the step of transferring a non-solidified low viscosity molding material through the runner system into the mold cavity.

4. The method of claim 1, further comprising the step of forming a release film over the mold cavity.

5. The method of claim 1, further comprising the step of loading a semiconductor device into the mold cavity.

* * * * *